(No Model.)

D. D. PINKHAM.
VALVE GEAR.

No. 324,784. Patented Aug. 18, 1885.

WITNESSES
Edwin L. Yewell.
Chas. D. Davis

INVENTOR
D. D. Pinkham.
By C. H. Alexander
his Attorney.

UNITED STATES PATENT OFFICE.

DELMAR D. PINKHAM, OF LONGVIEW, TEXAS.

VALVE-GEAR.

SPECIFICATION forming part of Letters Patent No. 324,784, dated August 18, 1885.

Application filed June 15, 1885. (No model.)

*To all whom it may concern:*

Be it known that I, DELMAR D. PINKHAM, a citizen of the United States, residing at Longview, in the county of Gregg and State of Texas, have invented certain new and useful Improvements in Valve-Gears, of which the following is a specification, reference being had therein to the accompanying drawings.

My invention relates to improvements in mechanical movements adapted especially to the valve-gear of steam-engines, and is designed to produce a device having a reciprocatory movement having intermediate impulses.

The improvement consists, essentially, in the employment of cams peculiarly arranged on a shaft and actuating a reciprocating rod.

Figure 1:
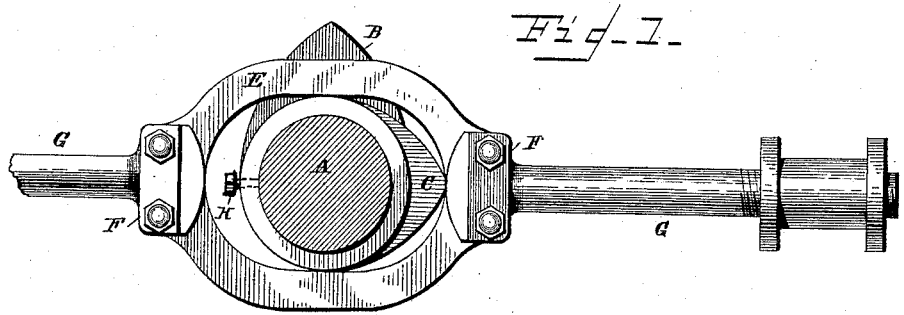
Figure 2:
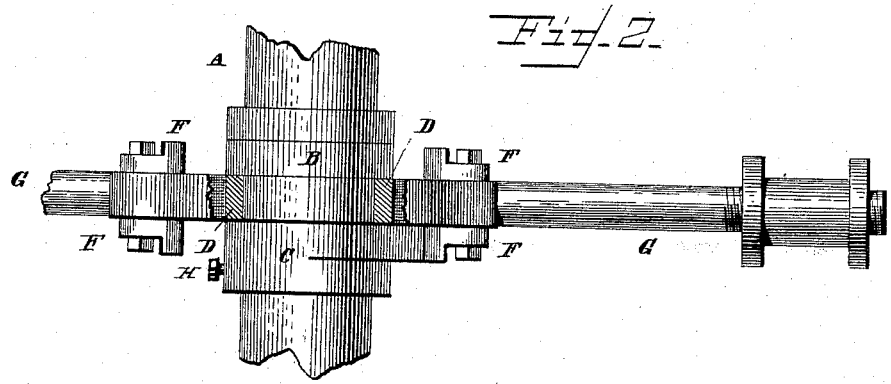

In describing the device reference is had to the annexed drawings, in which Figure 1 represents a side view of the device, and Fig. 2 a top view thereof with a portion broken away.

A shaft, A, carries two cams, one, B, extending farther from the shaft than the one C. Between the cams the shaft carries a loose collar, D. The cam B is keyed to the shaft, while the cam C is adjustable thereon, being held in any desired position by a set-screw or other known means.

Surrounding the collar D is a yoke, E, wide enough to receive the said collar, and of as great or greater length than the stroke which is caused by the cam B. The yoke carries on each side at each end an adjustable lug or bearing-piece, F, and is connected to or has formed on it at one or both ends rods G, which connect to the slide-valves of an engine or to any other mechanism to which the movement is adapted.

Were the cams B used alone, the device would be given a quick reciprocation with a momentary rest between the movement each way, which would make the device adaptable to some purposes, while the use of the cam C with the cam B starts the device almost on the same instant the cam B ceases to act.

As the cam C and the lugs may be adjusted, it is evident that it will act as a cut-off for the valve of an engine, and may be set to act on any portion of the stroke desired.

The device is shown as adapted to a double-acting engine.

The collar D forms an anti-friction bearing for the yoke.

I claim—

1. The combination, with a shaft, of cams of different projection, one being adjustable, and a yoke having at each end and on each side thereof adjustable lugs or bearings, substantially as and for the purpose specified.

2. The combination, with a shaft, of cams of different projection thereon, one being adjustable, a loose friction-collar of cylindrical shape on the shaft between the cams, a yoke surrounding said collar, and adjustable lugs or bearings on each side of each end of the said yoke, substantially as and for the purpose specified.

In testimony whereof I affix my signature in presence of two witnesses.

DELMAR D. PINKHAM.

Witnesses:
  MATTERSON FRANKLIN CAPPS,
  FRED. PORTER HAMILL.